United States Patent [19]
LaRosa et al.

[11] Patent Number: 5,461,643
[45] Date of Patent: Oct. 24, 1995

[54] DIRECT PHASE DIGITIZING APPARATUS AND METHOD

[75] Inventors: Christopher P. LaRosa, Lake Zurich; Michael J. Carney, Schaumburg, both of Ill.

[73] Assignee: Motorola, Schaumburg, Ill.

[21] Appl. No.: 44,530

[22] Filed: Apr. 8, 1993

[51] Int. Cl.$^6$ ..................................... H03D 3/22
[52] U.S. Cl. ......................... 375/329; 375/331; 375/346; 329/304
[58] Field of Search .................................. 375/83, 84, 85, 375/86, 87, 99, 346, 328; 329/304; 328/134; 324/76.82, 76.77

[56] References Cited

U.S. PATENT DOCUMENTS

| | | | |
|---|---|---|---|
| 5,084,669 | 1/1992 | Dent . | |
| 5,122,758 | 6/1992 | Tomita | 375/82 |
| 5,220,275 | 6/1993 | Holmquist | 324/76.82 |
| 5,260,975 | 11/1993 | Saito | 375/83 |
| 5,270,666 | 12/1993 | Rapeli et al. | 375/82 |
| 5,299,232 | 3/1994 | LaRosa et al. | 375/99 |
| 5,367,538 | 11/1994 | LaRosa et al. | 375/82 |

*Primary Examiner*—Edward L. Coles, Sr.
*Assistant Examiner*—Madeleine A. V. Nguyen
*Attorney, Agent, or Firm*—Kirk W. Dailey

[57] ABSTRACT

A radio receiver directly digitizes the phase of an intermediate frequency (IF) signal with a desired resolution. The frequency of the reference oscillator in the direct phase digitizer is reduced when compared to the frequency previously required for the same resolution. The reduction in the reference oscillator frequency is accomplished by differentiating between IF zero-crossings that occur during the first half of a reference oscillator cycle and zero-crossings which occur during the second half of the reference oscillator cycle. The apparatus utilizes 2 zero-crossing detectors, the first zero-crossing detector is driven by a positive edge of the reference oscillator signal and the second zero-crossing detector is driven by a negative edge of the reference oscillator signal. Depending upon the alignment of the negative edge zero-crossing indicator and the positive edge zero-crossing indicator, the N-bit phase signal is modified or shifted by one-half a phase sector.

11 Claims, 4 Drawing Sheets

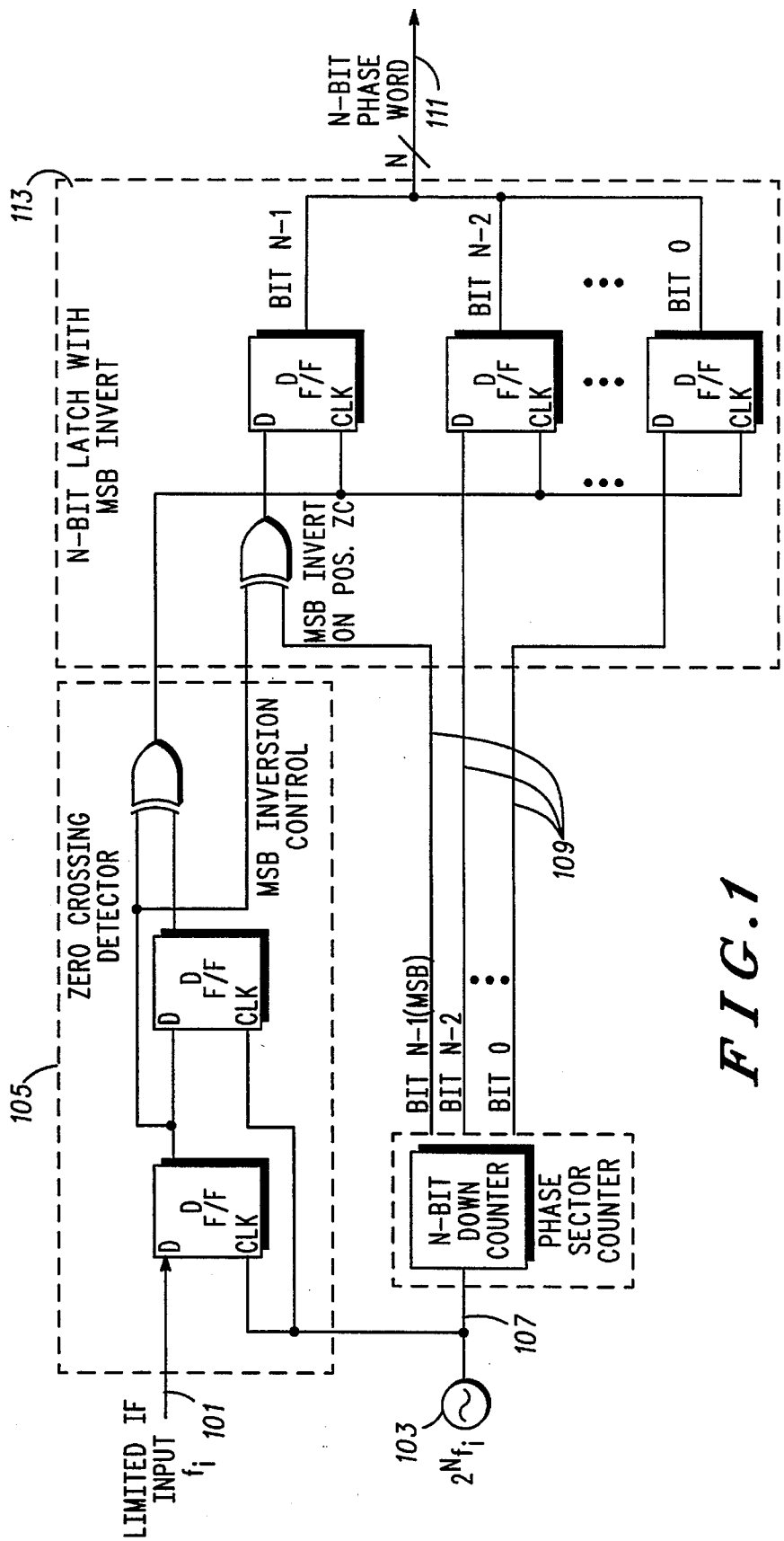
FIG. 1 —PRIOR ART—

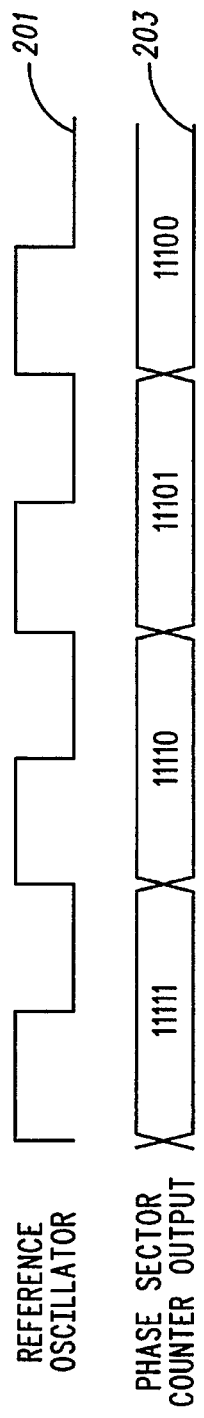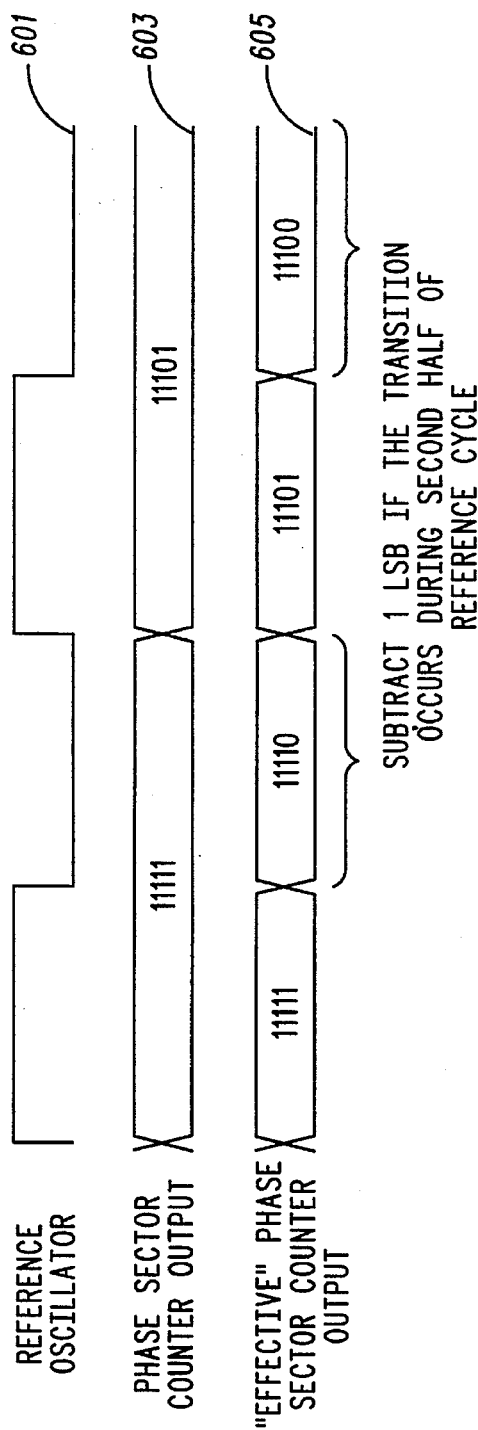

DIRECT PHASE DIGITIZING APPARATUS AND METHOD

FIELD OF THE INVENTION

This invention generally relates to radio receivers and more specifically to an apparatus and method for digitizing the phase of an intermediate frequency (IF) signal.

BACKGROUND OF THE INVENTION

Generally, within a radio receiver, a phase detector is used to recover the phase information from the received signal. In a system utilizing a digital phase modulation scheme, a symbol slicer determines the symbol that is represented by the recovered phase information. Several methods of detecting the phase of a received signal are available.

One method of detecting the phase of a received signal is direct phase digitizing with an apparatus as illustrated in FIG. 1. Using this method, the direct phase digitizing apparatus accepts a voltage limited IF signal 101. A reference oscillator 103 generates a reference oscillator signal 107. The reference oscillator signal 107 drives a phase sector counter and clocks a zero-crossing detector 105. The phase sector counter generates an estimated phase map 109. The zero-crossing detector 105 indicates when the limited IF input signal 101 crosses a predetermined voltage level. The estimated phase map is then sampled at each occurrence of a zero-crossing of the limited IF input signal 101 using an N-bit latch 113, forming a digital phase signal 111.

Using this method, the resolution of the digital phase signal 111 is directly dependent upon the frequency of the reference oscillator according to the following equation: $f_{ref}=2^N f_i$, where N is the number of bits desired in the phase word, $f_i$ is the input frequency of the limited IF signal and $f_{ref}$ is the frequency of the reference oscillator. A system having an intermediate frequency of 1.25 MHz would require a reference frequency of 40 MHz to produce a 5-bit phase word and a resolution of 32 phase sectors. A direct phase digitizer which could produce a phase word having the same resolution and using a lower frequency reference oscillator would be advantageous. A lower frequency reference oscillator reduces the size, cost and power consumption required by the phase demodulator. Size, cost and power consumption are important criteria used to evaluate the performance of a radio receiver.

BRIEF DESCRIPTION OF THE DRAWINGS

FIG. I is a block diagram illustrating a prior art direct phase digitizer.

FIG. 2 is an illustration of a timing diagram in accordance with the prior art of FIG. 1.

FIG. 6 is an illustration of a timing diagram in accordance with the present invention.

DESCRIPTION OF A PREFERRED EMBODIMENT

A radio communication system illustrated in FIG. 3–FIG. 7 encompasses a preferred embodiment. A receiver of the radio communication system directly digitizes the phase of the intermediate frequency (IF) signal. The frequency of the reference oscillator, in the preferred embodiment, is half the frequency of the prior art reference oscillator discussed in the background of the invention. However, the effective resolution of the direct phase digitizing apparatus, in the preferred embodiment, is equal to the direct phase digitizing apparatus in the prior art.

The reduction in the reference oscillator frequency is accomplished by differentiating between IF zero-crossings that occur during the first half of a reference oscillator cycle and zero-crossings which occur during the second half of the reference oscillator cycle. An implementation of the preferred embodiment utilizes 2 zero-crossing detectors. The first zero-crossing detector is driven by a positive edge of the reference oscillator signal, and the second zero-crossing detector is driven by a negative edge of the reference oscillator signal. Depending upon the alignment of the negative edge zero-crossing indicator and the positive edge zero-crossing indicator, the N-bit phase signal is modified or shifted by one-half a phase sector. This results in the modification of the relationship between the input frequency and the reference frequency such that $f_{ref}=2^{N-1}f_i$. In the case where the reference oscillator frequency is not a power-of-two multiple (i.e. $2^X$) of the input frequency, the frequency offset circuitry as described in U.S. patent application Ser. No. 806,511, filed Dec. 13, 1991 and assigned to the same assignee may be utilized.

Figure 3:
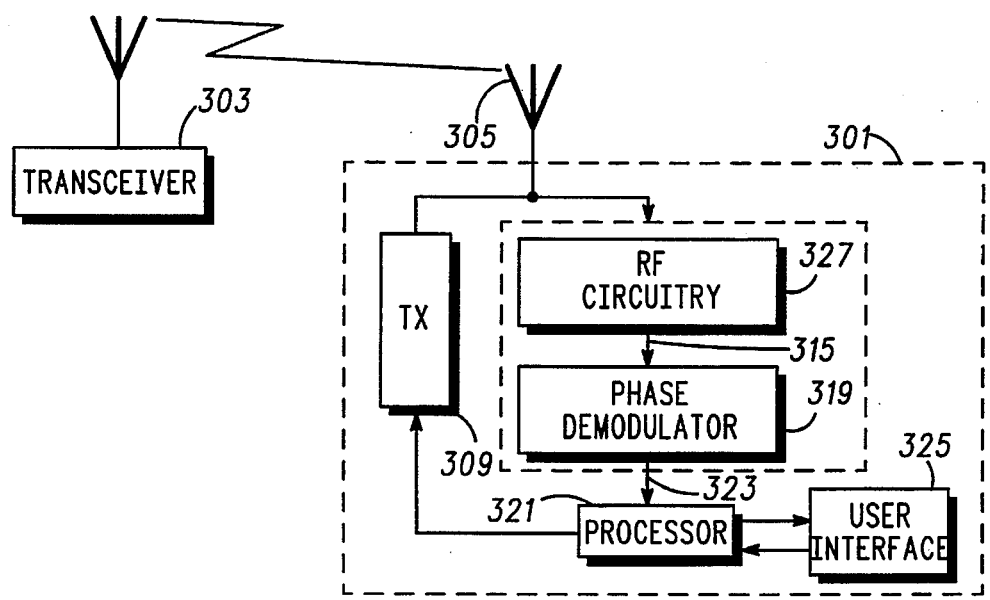
FIG. 3 is a block diagram illustrating a radio telephone system in accordance with the present invention.

FIG. 3 is an illustration of a block diagram of a radiotelephone system employing the present invention. In the radiotelephone system, a fixed site transceiver 303 sends and receives radio frequency (RF) signals to and from mobile and portable radiotelephones contained within a fixed geographic area served by the fixed site transceiver 303. A radiotelephone 301 is one such radiotelephone served by the fixed site transceiver 303.

While receiving signals from the fixed site transceiver 303, the radiotelephone 301 uses an antenna 305 to couple the RF signals and converts the RF signals into electrical RF signals. The electrical RF signals are received by a radio receiver 311. The radio receiver 311 includes RF circuitry 327 and a phase demodulator 319. The RF circuitry 327 generates an intermediate frequency (IF) signal 315. This signal is input into a phase demodulator 319. The phase demodulator 319 outputs a symbol signal 323 for use by a processor 321. The processor 321 formats the symbol signal 323 into voice or data for a user interface 325. The user interface 325 contains a microphone, a speaker and a keypad.

Upon the transmission of RF signals from the radiotelephone 301 to the fixed site transceiver 303, the processor 321 formats the voice and/or data signals from the user interface 325. The formatted signals are input into a transmitter 309. The transmitter 309 converts the data into electrical RF signals. The electrical RF signals are converted into RF signals and output by the antenna 305. The RF signals are received by the fixed site transceiver 303.

Figure 4:
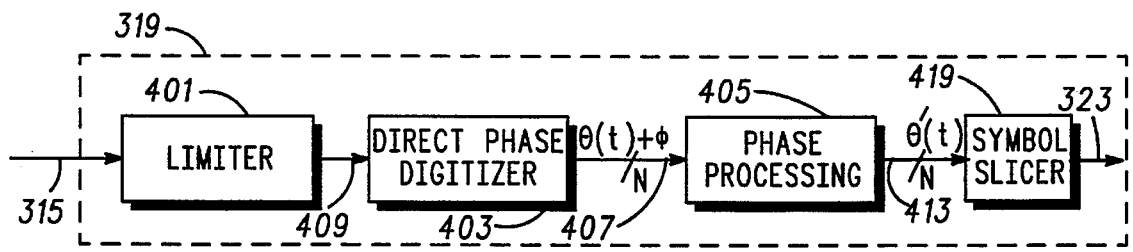
FIG. 4 is a block diagram illustrating a phase demodulator in accordance with the present invention.

FIG. 4 is an illustration of a block diagram of the phase demodulator 319 illustrated in FIG. 3. The phase demodulator 319 includes a limiter 401, a direct phase digitizer 403, a phase processing circuit 405 and a symbol slicer 419. The limiter 401 receives the IF signal 315 and limits the voltage of the IF signal 315 to two voltage levels corresponding to a logic level 0 and a logic level 1. The limiter 401 outputs a limited receive signal 409. The direct phase digitizer 403, as more fully explained below, uses zero-crossings of the limited received signal 409 to sample a modulo $2\pi$ phase ramp function. In the preferred embodiment, the modulo $2\pi$ phase ramp function is generated by a phase sector counter. The samples are used to generate the digitized phase signal 407 ($\theta(t)+\phi$). $\theta(t)$ is the desired digitized phase signal and $\phi$ is a constant phase offset dependent upon a delay between the fixed-site transceiver 303 and the radiotelephone 301. The digitized phase signal 407 is input into the phase processing unit 405. The phase processing unit 405 removes the constant phase offset ($\phi$). The phase processing unit 405 may contain either a coherent phase processor or a differentially coherent phase processor. In the preferred embodiment, a differentially coherent phase processor is used to remove the constant phase offset ($\phi$). The resulting digital phase signal ($\theta'$)(t)) 413 is input to the symbol slicer 419. The symbol slicer 419 outputs the symbol decisions 323 which correspond to the detected phase signal 413.

Figure 5:
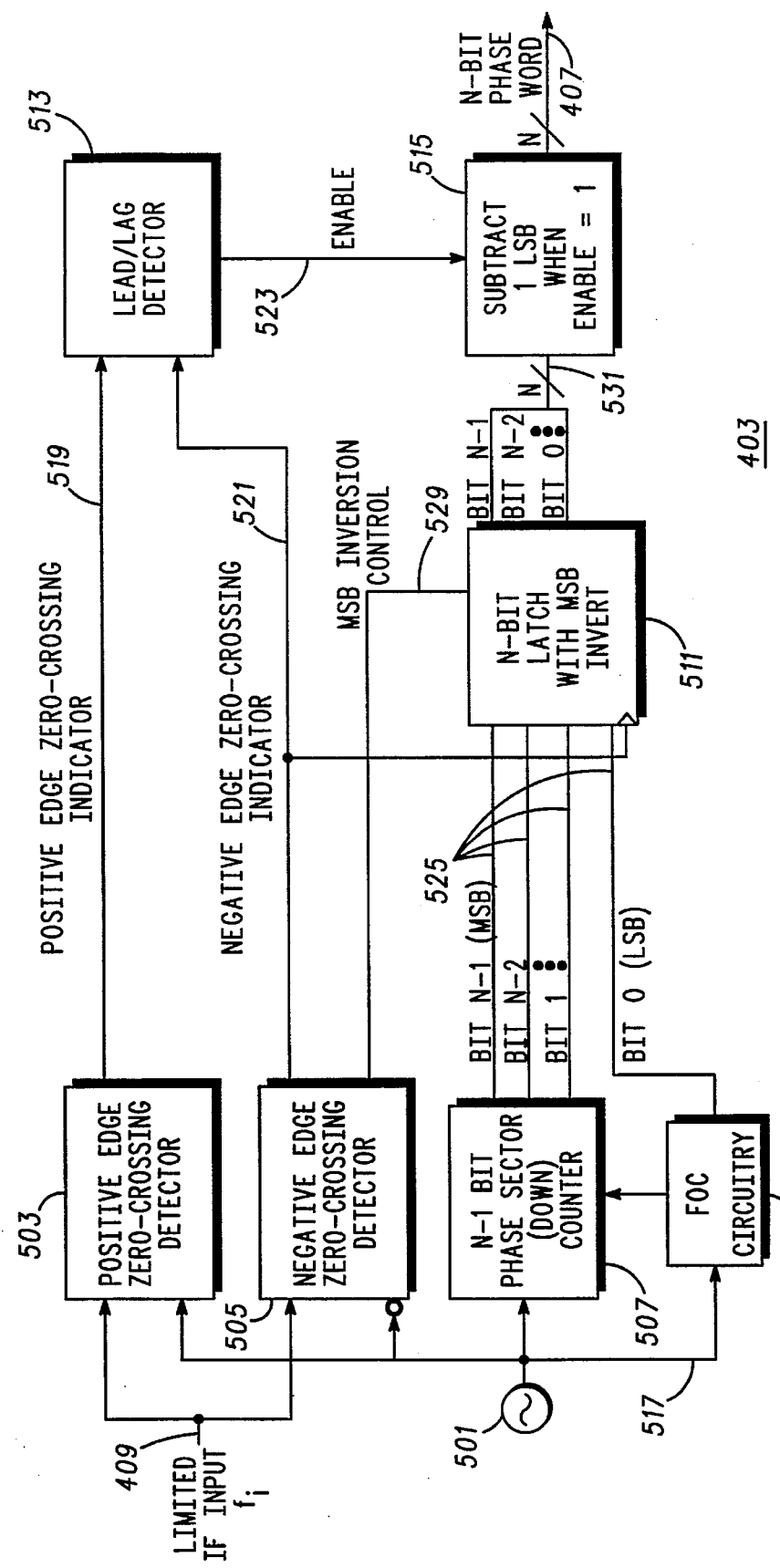
FIG. 5 is a block diagram illustrating a direct phase digitizer in accordance with the present invention.

FIG. 5 is an illustration of a detailed block diagram of the direct phase digitizer 403 illustrated in FIG. 4. Here, the limited IF signal 409 is input into a positive edge zero-crossing detector 503 and a negative edge zero-crossing detector 505. In the preferred embodiment, both zero-crossing detectors 503, 505 indicate zero-crossings at both the positive and negative crossings of the limited IF input signal 409. Such a zero-crossing detector is illustrated in FIG. 1 as zero-crossing detector 105. The present invention is not dependent upon the specific zero-crossing detectors. Other zero-crossing detectors may be used such as those which indicate only positive edge zero-volt level crossings of the limited IF signal or those indicating only negative edge zero-volt level crossings of the limited IF signal. Additionally, any other predetermined voltage level-crossing detector may be used.

Figure 7:
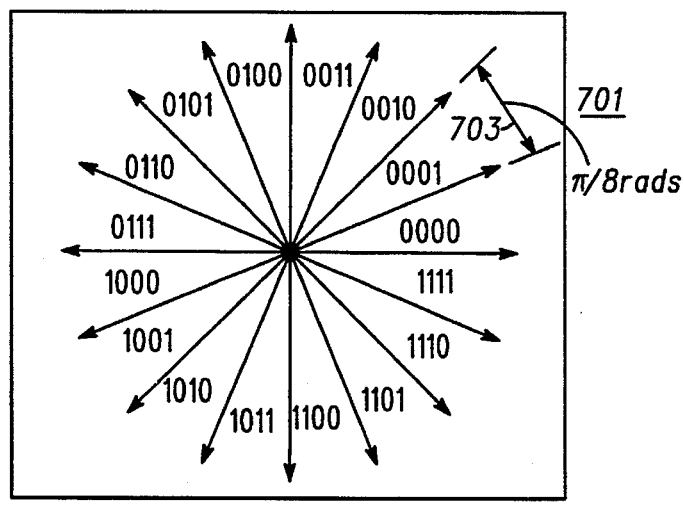
FIG. 7 is an illustration of a four bit phase sector map in accordance with the present invention.

The reference oscillator 501 generates a reference oscillator signal 517. The reference oscillator signal 517 drives the N–1 bit phase sector counter 507 and the positive edge zero-crossing detector 503 with its positive edge and drives the negative edge zero-crossing detector 505 with its negative edge. In the preferred embodiment, the N–1 bit phase sector counter 507 is a 4-bit digital counting device. A N–1 bit counter can generate $2^{N-1}$ phase sectors; thus, a 4-bit counter generates 16 phase sectors as illustrated in FIG. 7. The resolution, M, is defined as the number of phase sectors available. Here, the resolution would be 16. The least significant bit (LSB) or BIT 0 can either be tied to an electrical ground, pulled to a predetermined voltage or, as indicated in the preferred embodiment, may be created by the frequency offset compensation (FOC) circuitry 509. The FOC circuitry 509 is useful when the reference oscillator 501 does not generate a reference frequency ($f_{ref}$) which is a power-of-two multiple of the intermediate frequency ($f_i$). Details concerning the FOC circuitry 509 may be found in U.S. patent application Ser. No. 806,511, filed Dec. 13, 1991 entitled "Frequency Translation Apparatus and Method" and assigned to the same assignee. The N–1 bits output from the N–1 bit phase sector counter 507 and the LSB are input into a N-bit latch 511. The N-bit latch 511 is latched with the negative edge zero-crossing indicator signal 521. The output of the latch 511 is a digital phase signal 531.

The lead/lag detector 5 13 is used to modify the digital phase signal 531, effectively increasing the resolution of the digital phase signal 531. The positive edge zero-crossing indicator signal 519 and the negative edge zero-crossing indicator signal 521 are input into the lead/lag detector 513. The lead/lag detector 513 generates a modify-enable signal 523 when the negative edge zero-crossing indicator signal 521 is active before the positive edge zero-crossing indicator signal 5 19 is active. The modify-enable signal 523 is input into the subtracter 515. Subtracter 515 subtracts one least significant bit when the modify-enable signal is active. This effectively shifts the digital phase signal 531 by one half a phase sector, resulting in the direct phase digitizing apparatus 403 having an effective resolution, M', equal to 32 phase sectors, as indicated in FIG. 6. The effective 32 phase sector resolution is equal in resolution to a typical 5-bit estimated phase map of the prior art. No subtraction is required when a zero-crossing occurs in the first half of the reference oscillator period. This situation is recognized when the positive edge zero-crossing indicator 519 is active before the negative edge zero-crossing indicator signal 521; the modify-enable signal 523 is then forced low and no modification of the digital phase signal 531 occurs. Other equally sufficient implementations of a one-half phase sector shifter may be implemented, such as a device which subtracts a value greater than the value of the least significant bit of the digital phase signal 531.

FIG. 6 illustrates the timing in accordance with the preferred embodiment illustrated in FIG. 5. Waveform 601 is an illustration of the reference oscillator signal 517. Waveform 603 is an illustration of signal 525, which is the N–1 bit phase sector counter output with the least significant bit supplied by the FOC circuitry 509. Waveform 605 illustrates the improved resolution obtained by subtracting one LSB from signal 525 during the second half of the reference oscillator cycle. Comparing FIG. 6 to FIG. 2, the period of the reference oscillator signal 20 1 of FIG. 2 is half the period of the reference oscillator signal 601 of FIG. 6. The resulting phase sector counter output 203 of FIG. 2 is equal to that of the effective phase sector counter output 605 of FIG. 6. Thus, the present embodiment provides a direct phase digitizing apparatus having equal resolution and reduced reference oscillator requirements. Reducing the oscillator requirements effectively reduces the cost, power consumption and size of the radio receiver.

What is claimed is:

1. A direct phase digitizing apparatus accepting an intermediate frequency signal having a phase and a first predetermined frequency, the direct phase digitizing apparatus comprising:

means for generating a reference oscillator signal having positive and negative edges and a second predetermined frequency;

means for generating an estimated phase map dependent upon said second predetermined frequency and having a first predetermined resolution of M phase sectors;

first means, responsive to said positive edges of said reference oscillator signal, for detecting predetermined-voltage level crossings of the intermediate frequency signal, forming a positive-crossing signal;

second means, responsive to said negative edges of said reference oscillator signal, for detecting predetermined-voltage level crossings of the intermediate frequency signal, forming a negative-crossing signal;

means, responsive to said first means, for sampling said estimated phase map and forming a digital phase signal; and means, responsive to said first and said second means, for modifying said digital phase signal, such that the digital phase signal has an effective resolution, M', greater than the first predetermined resolution, M.

2. A direct phase digitizing apparatus in accordance with claim 1 wherein said first and second means detect only positive edge predetermined-voltage level crossings of the intermediate frequency signal.

3. A direct phase digitizing apparatus in accordance with claim 1 wherein said first and second means detect only negative edge predetermined-voltage level crossings of the intermediate frequency signal.

4. A direct phase digitizing apparatus in accordance with claim 1 wherein said first and said second means detect positive and negative predetermined-voltage level crossings of the intermediate frequency signal.

5. A direct phase digitizing apparatus in accordance with claim 1 wherein said means for generating said estimated phase map further comprises a digital counting device.

6. A direct phase digitizing apparatus in accordance with claim 1 wherein said means for modifying said digital phase signal further comprises:
    means for monitoring the positive-crossing and negative-crossing signals;
    means for generating a modify-enable signal when the negative-crossing signal is active before the positive-crossing signal is active;
    means, responsive to the modify-enable signal, for shifting the digital phase signal by one half of a phase sector.

7. A direct phase digitizing apparatus in accordance with claim 1 wherein the means for sampling said estimated phase map is responsive to said second means.

8. A direct phase digitizing apparatus accepting an intermediate frequency (IF) signal having a phase and a first predetermined frequency, the direct phase digitizing apparatus comprising:
    a reference oscillator generating a reference oscillator signal having positive and negative edges and a second predetermined frequency;
    a counting device generating an estimated phase map dependent upon said second predetermined frequency and having a predetermined resolution of M phase sectors;
    a first zero-crossing detector, responsive to said positive edges of said reference oscillator signal, detecting zero-crossings of the IF signal, forming a positive edge zero-crossing indicator signal;
    a second zero-crossing detector, responsive to said negative edges of said reference oscillator signal, detecting zero-crossings of the IF signal, forming a negative edge zero-crossing indicator signal;
    a latching device, responsive to the negative edge zero-crossing indicator signal, sampling said estimated phase map, forming a digital phase signal;
    a detecting device for detecting when the negative edge zero-crossing indicator signal leads the positive edge zero-crossing indicator signal and generating a modify-enable signal responsive thereto; and
    a subtracting device, responsive to the modify-enable signal, for subtracting one-half a phase sector from said digital phase signal.

9. A radio receiver receiving a first radio frequency (RF) signal, the radio receiver comprising:
    means for converting the first RF signal to an intermediate frequency (IF) signal having a phase and a first predetermined frequency;
    a phase demodulating apparatus comprising:
        means for limiting the voltage range of the IF signal forming a limited IF signal;
        means for generating a reference oscillator signal having positive and negative edges and a second predetermined frequency,
        means for generating an estimated phase map dependent upon said second predetermined frequency and having a first predetermined resolution,
        first means, responsive to said positive edges of said reference oscillator signal, for detecting predetermined-voltage evel crossings of the limited IF signal, forming a positive-crossing signal,
        second means, responsive to said negative edges of said reference oscillator signal, for detecting predetermined-voltage level crossings of the limited IF signal, forming a negative-crossing signal,
        means, responsive to said first means for detecting, for sampling said estimated phase map, forming a digital phase signal,
        means, responsive to said first and said second means for detecting, for modifying said digital phase signal, such that the digital phase signal has an effective resolution greater than the first predetermined resolution of the estimated phase map, and
        means, responsive to the modified digital phase signal, for generating symbol decisions.

10. A method of direct phase digitizing comprising:
    accepting an intermediate frequency signal having a phase and a first predetermined frequency;
    generating a reference oscillator signal having positive and negative edges and a second predetermined frequency;
    generating an estimated phase map dependent upon the second predetermined frequency and having a first predetermined resolution of M phase sectors;
    detecting predetermined-voltage level crossings of the intermediate frequency signal responsive to the positive edges of the reference oscillator signal and forming a positive-crossing signal;
    detecting predetermined-voltage level crossings of the intermediate frequency signal responsive to the negative edges of the reference oscillator signal and forming a negative-crossing signal;
    sampling the estimated phase map responsive to the second step of detecting and forming a digital phase signal; and
    modifying the digital phase signal responsive to the first and the second step of detecting.

11. A method of direct phase digitizing in accordance with claim 10 wherein the step of modifying the digital phase signal further comprises:
    monitoring the positive-crossing and negative-crossing signals;
    generating a modify-enable signal when the negative-crossing signal is active before the positive-crossing signal is active;
    shifting the digital phase signal by one half of a phase sector responsive to the modify-enable signal.

* * * * *